( 12 ) United States Patent
Suzuki et al.

(10) Patent No.: US 10,894,558 B2
(45) Date of Patent: Jan. 19, 2021

(54) STEERING SYSTEM

(71) Applicant: JTEKT CORPORATION, Osaka (JP)

(72) Inventors: Takuya Suzuki, Kashihara (JP); Akio Osuka, Kyoto (JP)

(73) Assignee: JTEKT CORPORATION, Osaka (JP)

( * ) Notice: Subject to any disclaimer, the term of this patent is extended or adjusted under 35 U.S.C. 154(b) by 63 days.

(21) Appl. No.: 16/352,040

(22) Filed: Mar. 13, 2019

(65) Prior Publication Data

US 2019/0283792 A1 Sep. 19, 2019

(30) Foreign Application Priority Data

Mar. 16, 2018 (JP) .................................. 2018-049676
Feb. 6, 2019 (JP) .................................. 2019-019548

(51) Int. Cl.
*B62D 1/184* (2006.01)
*B62D 1/187* (2006.01)
*B62D 1/185* (2006.01)

(52) U.S. Cl.
CPC ............. *B62D 1/184* (2013.01); *B62D 1/187* (2013.01); *B62D 1/185* (2013.01)

(58) Field of Classification Search
CPC ......... B62D 1/187; B62D 1/184; B62D 1/185
See application file for complete search history.

(56) References Cited

U.S. PATENT DOCUMENTS

2017/0008549 A1\* 1/2017 Tomiyama ............. B62D 1/187

FOREIGN PATENT DOCUMENTS

| CN | 206437052 U | 8/2017 |
| JP | 2008-030542 A | 2/2008 |
| JP | 2013-001243 A | 1/2013 |
| JP | 2017-136933 A | 8/2017 |
| WO | 2007/058158 A1 | 5/2007 |

OTHER PUBLICATIONS

Sep. 3, 2019 Extended European Search Report issued in European Patent Application No. 19162818.9.

\* cited by examiner

*Primary Examiner* — Karen Beck
(74) *Attorney, Agent, or Firm* — Oliff PLC

(57) ABSTRACT

A steering system includes a steering shaft, a fixed bracket, a column jacket, and a lock mechanism. The lock mechanism includes an insertion shaft, an operation member, a first pressing member, a second pressing member, and a drive mechanism. The lock mechanism is configured to lock a position of the column jacket relative to the fixed bracket after the tilt adjustment. The drive mechanism is configured to move at least one of the first pressing member and the second pressing member so that the first pressing member and the second pressing member approach each other in an insertion axis direction of the insertion shaft along with rotation of the operation member.

5 Claims, 12 Drawing Sheets

STEERING SYSTEM

INCORPORATION BY REFERENCE

The disclosure of Japanese Patent Application No. 2019-019548 filed on Feb. 6, 2019 including the specification, drawings and abstract, is incorporated herein by reference in its entirety.

BACKGROUND

1. Technical Field

The present disclosure relates to a steering system.

2. Description of the Related Art

A steering system described in Japanese Patent Application Publication No. 2013-001243 (JP 2013-001243 A) is provided with a lock mechanism for locking the position of a steering column after tilt adjustment. The lock mechanism includes an operation lever and a support shaft. The support shaft is inserted through tilt elongated holes and telescopic elongated holes. The tilt elongated holes are formed in a pair of side plates of a vehicle body-side bracket. The telescopic elongated holes are formed in a pair of side plates of a column-side bracket.

SUMMARY

During the tilt adjustment, the support shaft moves in a tilt direction together with the steering column and the column-side bracket relative to the vehicle body-side bracket. When the operation lever is operated after the tilt adjustment, an operation force of the operation lever is converted to an axial force of the support shaft, and the side plates of the vehicle body-side bracket are subjected to the axial force and deflected so as to approach each other. Through the deflection of the side plates of the vehicle body-side bracket, the side plates of the column-side bracket are held between the side plates of the vehicle body-side bracket. Thus, the position of the steering column after the tilt adjustment is locked.

The positions on the side plates of the vehicle body-side bracket where the axial force of the support shaft is applied vary depending on the position of the steering column after the tilt adjustment. The side plates of the vehicle body-side bracket extend downward in the tilt direction from a plate portion fixed to the vehicle body. Therefore, the side plates of the vehicle body-side bracket are deflected about the upper ends in the tilt direction. Thus, the side plates of the vehicle body-side bracket are difficult to deflect as the positions where the axial force of the support shaft is received are closer to the upper ends in the tilt direction, and are easy to deflect as the positions where the axial force of the support shaft is received are closer to the lower ends in the tilt direction. Accordingly, an operation load on the operation lever that is necessary to deflect the side plates of the vehicle body-side bracket varies depending on the position of the steering column after the tilt adjustment.

The present disclosure was made under the above circumstances and it is an object of the present disclosure to provide a steering system in which a difference in an operation load on an operation member due to the position of a column jacket after tilt adjustment can be reduced.

An aspect of the present disclosure provides a steering system configured to perform tilt adjustment. The steering system includes a steering shaft, a fixed bracket, a column jacket, and a lock mechanism. A steering member is coupled to the steering shaft at one end. The fixed bracket is fixed to a vehicle body and includes a first side plate and a second side plate each having an insertion hole. The column jacket supports the steering shaft so that the steering shaft is rotatable, and is disposed between the first side plate and the second side plate. The column jacket is configured to move relative to the fixed bracket during the tilt adjustment. The lock mechanism is configured to lock a position of the column jacket relative to the fixed bracket after the tilt adjustment. The lock mechanism includes an insertion shaft, an operation member, a first pressing member, a second pressing member, and a drive mechanism. The insertion shaft is inserted through the insertion hole of the first side plate and the insertion hole of the second side plate. The operation member is supported on the insertion shaft and is operable rotationally. The first pressing member is configured to press the first side plate so as to push the first side plate against the column jacket. The second pressing member is configured to press the column jacket through the insertion hole of the second side plate so as to push the column jacket against the first side plate. The drive mechanism is configured to move at least one of the first pressing member and the second pressing member so that the first pressing member and the second pressing member approach each other in an insertion axis direction of the insertion shaft along with rotation of the operation member.

In the steering system, the second pressing member may include a facing portion that faces an outer side surface of the second side plate, and the lock mechanism may further include an elastic member that is configured to be elastically deformed between the facing portion of the second pressing member and the outer side surface of the second side plate when the second pressing member presses the column jacket.

With the above-mentioned configuration, the drive mechanism causes the first pressing member and the second pressing member to approach each other in the insertion axis direction in response to a rotational operation for the operation member. The first pressing member thus presses the first side plate of the fixed bracket, whereby the first side plate is pushed against the column jacket. The second pressing member presses the column jacket without intermediation of the second side plate of the fixed bracket. The column jacket is thus pushed against the first side plate. When the column jacket and the first side plate are pushed against each other, friction is caused between the column jacket and the first side plate. Movement of the column jacket relative to the fixed bracket is restricted by this friction. That is, the position of the column jacket relative to the fixed bracket is locked.

The position of the column jacket relative to the fixed bracket can thus be locked without holding the column jacket between the first side plate and the second side plate of the fixed bracket. Accordingly, a difference in an operation load on the operation member due to the position of the column jacket after the tilt adjustment can be reduced. The elastic member is elastically deformed between the facing portion of the second pressing member and the second side plate when the second pressing member presses the column jacket. With the above-mentioned configuration, the elastic member can fill a clearance between the second side plate and the facing portion of the second pressing member while the second pressing member securely keeps pressing the column jacket. Support rigidity can thus be improved while the difference in the operation load on the operation member due to the position of the column jacket after the tilt adjustment can be reduced.

In the steering system, the drive mechanism may include: a first cam configured to rotate together with the operation member; and a second cam that is provided on at least one of the first pressing member and the second pressing member and is configured to engage with the first cam. In the steering system, the drive mechanism may include: an external thread provided at a first end of a shank of a bolt serving as the insertion shaft; and a nut that engages with the external thread. The drive mechanism may be configured to cause the first pressing member and the second pressing member to approach each other in the insertion axis direction by causing the nut and a head provided at a second end of the shank to approach each other along with the rotation of the operation member.

With the above-mentioned configuration, the first pressing member and the second pressing member can be caused to approach each other by the drive mechanism having a simple structure, namely, the engagement of the first cam and the second cam. With the above-mentioned configuration, the drive mechanism is constituted by the external thread of the bolt and the nut. Accordingly, the first pressing member and the second pressing member can be caused to approach each other by using a simple structure, namely, the engagement of the bolt and the nut.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the present disclosure are described below in detail with reference to the accompanying drawings.

First Embodiment

Figure 1:
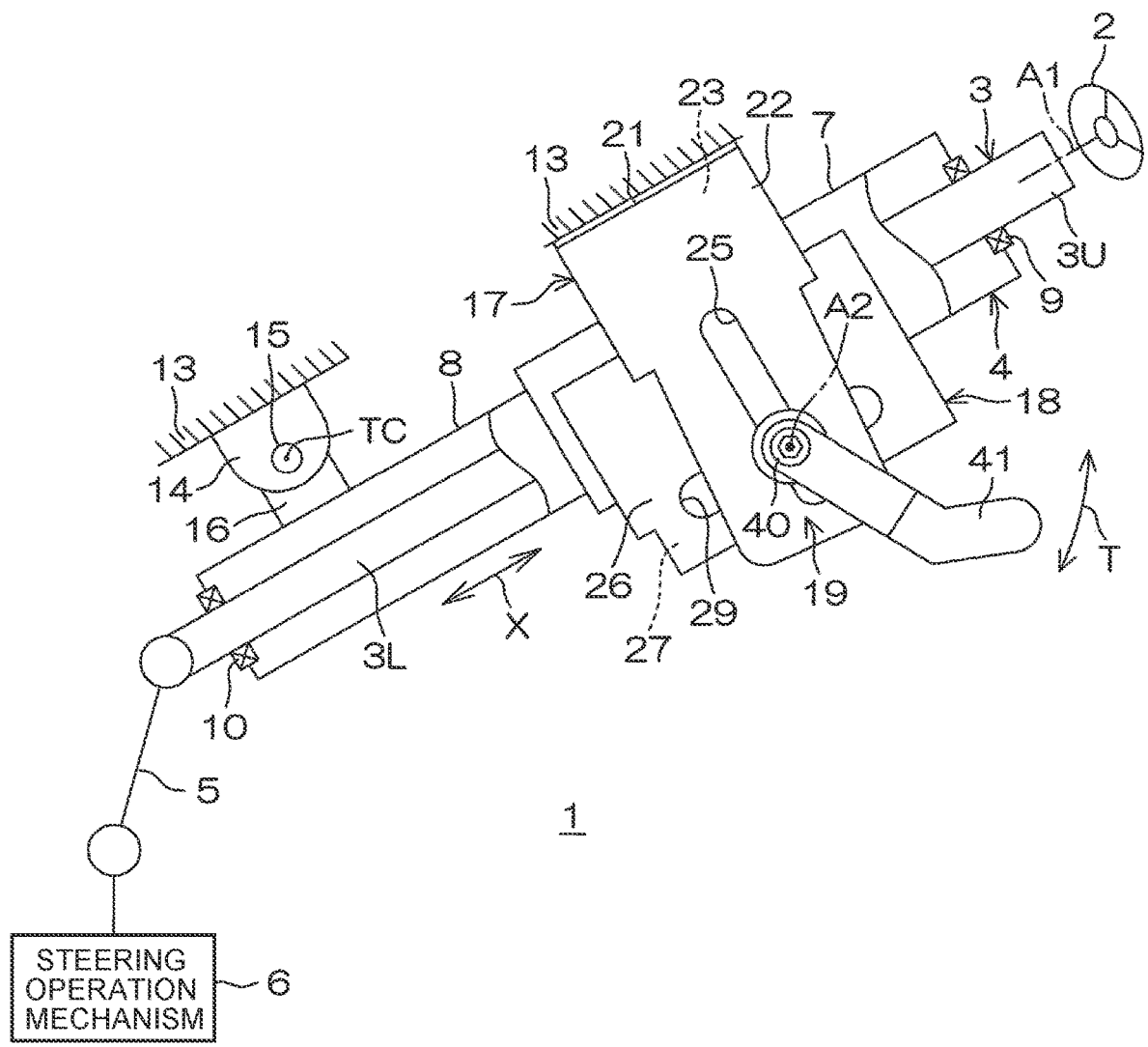
FIG. 1 is a schematic view illustrating the overall structure of a steering system according to a first embodiment of the present disclosure.

FIG. 1 is a schematic view illustrating the overall structure of a steering system 1 according to one embodiment of the present disclosure. Referring to FIG. 1, the steering system 1 includes a steering shaft 3, a column jacket 4, an intermediate shaft 5, and a steering operation mechanism 6. The steering shaft 3 extends in a substantially vertical direction of a vehicle. A steering member 2 such as a steering wheel is coupled to one end (upper axial end) of the steering shaft 3. The steering system 1 turns steered wheels (not illustrated) in association with a steering operation for the steering member 2. For example, the steering operation mechanism 6 is a rack and pinion mechanism, but is not limited to the rack and pinion mechanism.

A direction in which a central axis A1 of the steering shaft 3 extends is hereinafter referred to as a column axis direction X. The steering shaft 3 includes a tubular upper shaft 3U and a tubular lower shaft 3L that extend in the column axis direction X. For example, the upper shaft 3U and the lower shaft 3L are fitted together by spline fitting or serration fitting so as to be movable relative to each other. The steering member 2 is coupled to the upper axial end of the upper shaft 3U.

The steering system 1 further includes a lower fixed bracket 14, a tilt center shaft 15, and a lower movable bracket 16. The lower fixed bracket 14 is fixed to a vehicle body 13. The tilt center shaft 15 is supported by the lower fixed bracket 14. The lower movable bracket 16 is fixed to the outer periphery of the lower axial end of the column jacket 4 and is supported by the lower fixed bracket 14 so as to be pivotable about the tilt center shaft 15.

The column jacket 4 includes a lower jacket 8 and an upper jacket 7. The lower jacket 8 is supported by the lower fixed bracket 14 so as to be pivotable about the tilt center shaft 15. The upper jacket 7 is externally fitted to the lower jacket 8 in a slidable manner. The column axis direction X is also an axial direction of the upper jacket 7 and an axial direction of the lower jacket 8. The steering shaft 3 is inserted through the column jacket 4. The upper shaft 3U is rotatably supported by the upper jacket 7 via a bearing 9. The lower shaft 3L is rotatably supported by the lower jacket 8 via a bearing 10. As the upper shaft 3U moves in the column axis direction X relative to the lower shaft 3L, the upper jacket 7 moves in the column axis direction X relative to the lower jacket 8. The column jacket 4 is extensible or contractible in the column axis direction X together with the steering shaft 3.

By extending or contracting the steering shaft 3 and the column jacket 4 in the column axis direction X, the position of the steering member 2 can be adjusted in a fore-and-aft direction of the vehicle. Thus, the steering system 1 has a telescopic adjustment function. The lower jacket 8 pivots in a tilt direction T together with the steering shaft 3 about a central axis of the tilt center shaft 15 (tilt center TC) provided in the vicinity of the lower axial end of the steering shaft 3. The tilt direction T is a direction intersecting the column axis direction X. By pivoting the steering shaft 3 and the column jacket 4 about the tilt center TC, the position of the steering member 2 can be adjusted in the vertical direction of the vehicle. Thus, the steering system 1 has a tilt adjustment function.

The steering system 1 further includes an upper fixed bracket 17 and a lock mechanism 19. The upper fixed bracket 17 is fixed to the vehicle body 13. The upper fixed bracket 17 is an example of "a fixed bracket" of the present disclosure. The column jacket 4 further includes an upper movable bracket 18 fixed to the upper jacket 7 by welding etc. The upper movable bracket 18 moves together with the upper jacket 7 during the tilt adjustment. The lock mechanism 19 is a mechanism for locking the position of the column jacket 4 after the tilt adjustment. A state of the steering system 1 in which the position of the column jacket 4 is locked by the lock mechanism 19 is referred to as "locked state." A state of the steering system 1 in which the locking of the position of the column jacket 4 by the lock mechanism 19 is released is referred to as "unlocked state."

Figure 2:
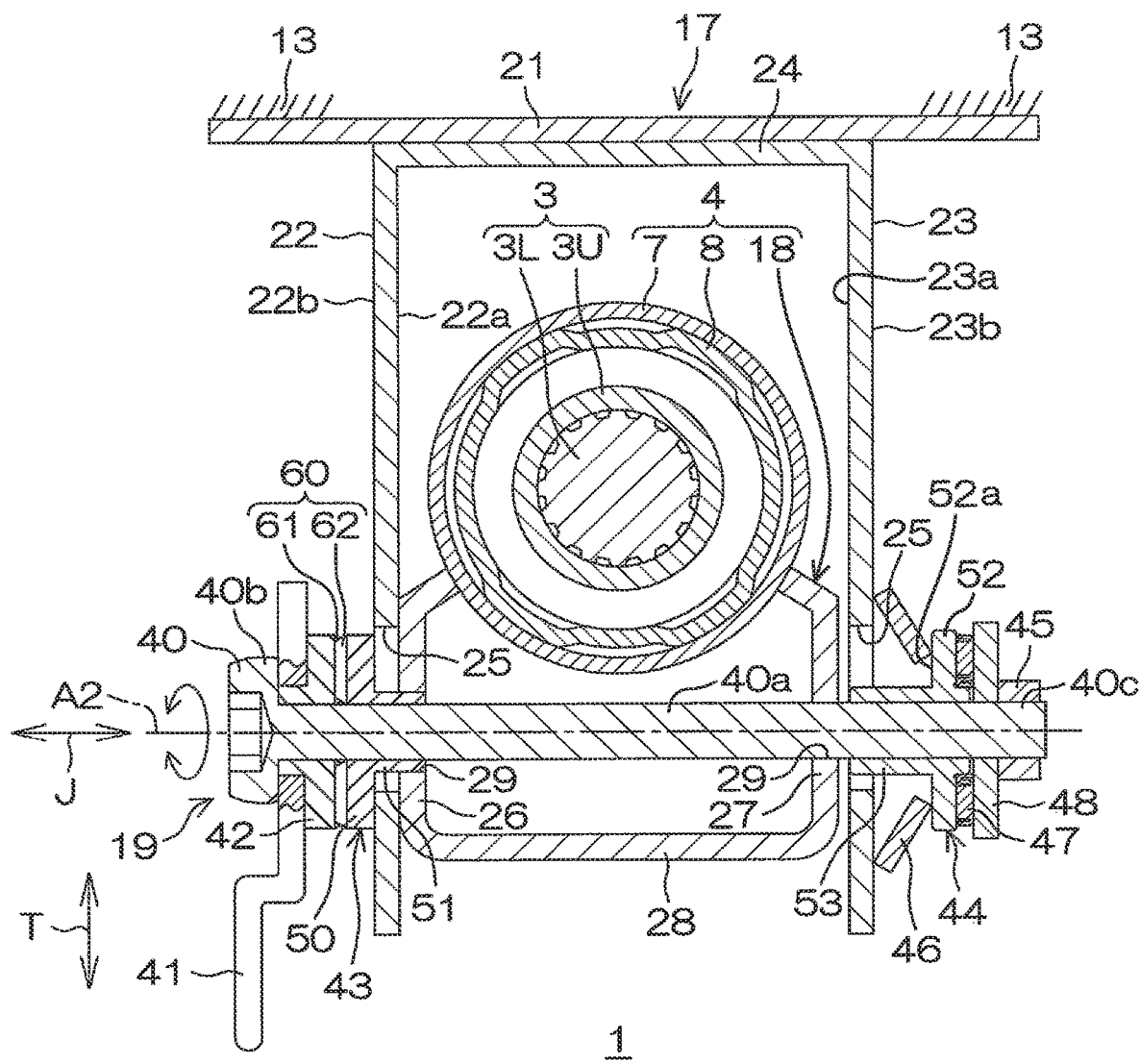
FIG. 2 is a sectional view of the steering system on the periphery of a lock mechanism, illustrating an unlocked state of the steering system.
Figure 3:
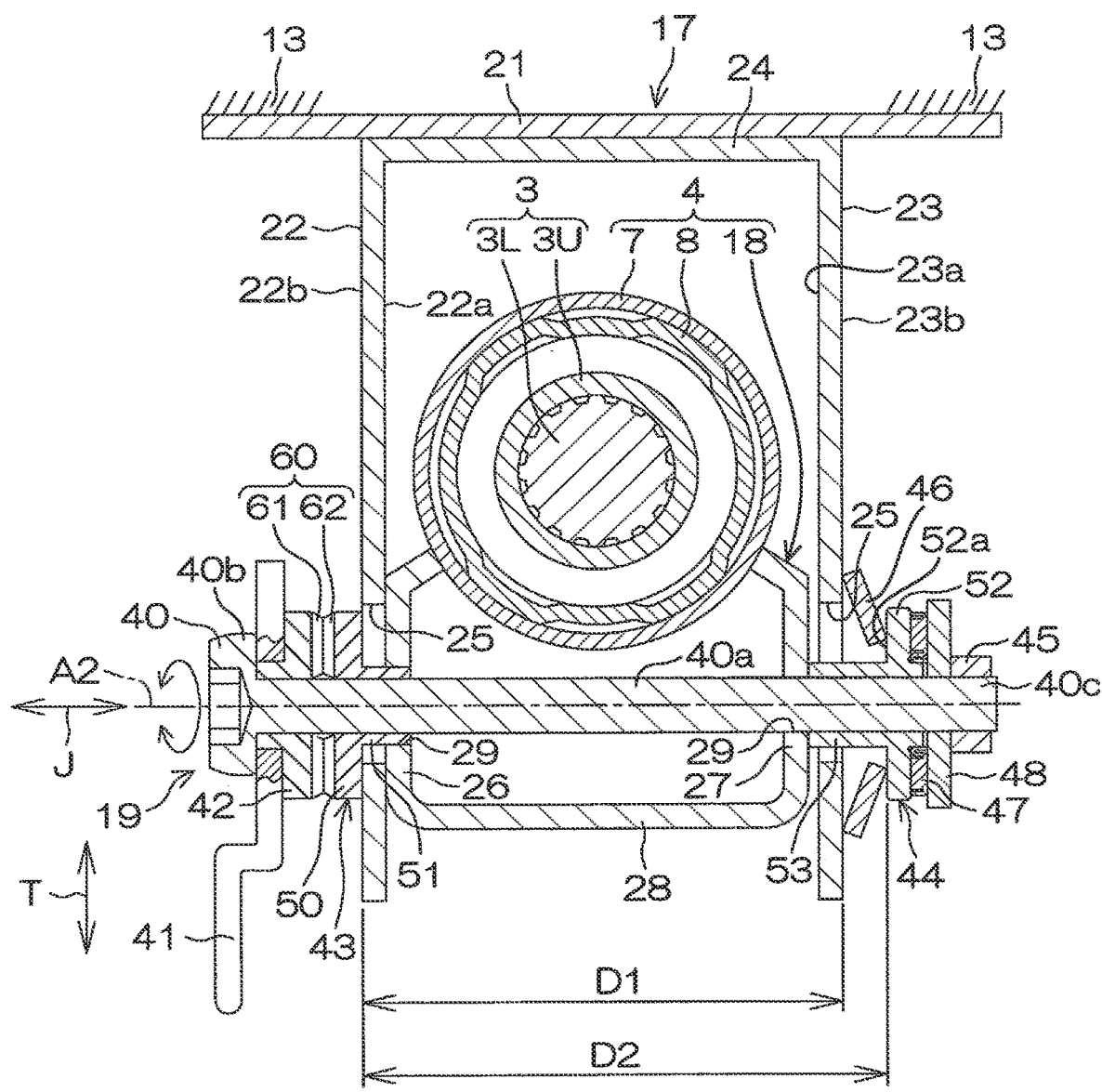
FIG. 3 is a sectional view of the steering system on the periphery of the lock mechanism, illustrating a locked state of the steering system.

FIGS. 2 and 3 are sectional views of the periphery of the lock mechanism 19. FIG. 2 is a view illustrating the unlocked state of the steering system 1. FIG. 3 is a view illustrating the locked state of the steering system 1. As illustrated in FIG. 2, the upper fixed bracket 17 includes an attachment plate 21, a first outer side plate 22 (first side plate), a second outer side plate 23 (second side plate), and a coupling plate 24.

The attachment plate 21 is attached to the vehicle body 13. The first outer side plate 22 and the second outer side plate 23 extend downward in the tilt direction T from the lower surface of the attachment plate 21. The first outer side plate 22 and the second outer side plate 23 face each other at a distance therebetween. The coupling plate 24 couples together the upper end of the first outer side plate 22 in the tilt direction T and the upper end of the second outer side plate 23 in the tilt direction T. The first outer side plate 22, the second outer side plate 23, and the coupling plate 24 are formed integrally. A tilt elongated hole 25 extending in the tilt direction T is formed in each of the first outer side plate 22 and the second outer side plate 23.

The upper movable bracket 18 includes a first inner side plate 26, a second inner side plate 27, and a coupling plate 28. The first inner side plate 26, the second inner side plate 27, and the coupling plate 28 are formed integrally. The upper movable bracket 18 is disposed between the first outer side plate 22 and the second outer side plate 23. The first inner side plate 26 and the second inner side plate 27 extend downward in the tilt direction T from the outer peripheral surface of the upper jacket 7 of the column jacket 4. The upper ends of the first inner side plate 26 and the second inner side plate 27 in the tilt direction T are connected to the outer peripheral surface of the upper jacket 7 of the column jacket 4 by welding etc. The coupling plate 28 couples together the lower end of the first inner side plate 26 in the tilt direction T and the lower end of the second inner side plate 27 in the tilt direction T.

The first inner side plate 26 has a plate shape conforming to an inner side surface 22a of the first outer side plate 22. The second inner side plate 27 has a plate shape conforming to an inner side surface 23a of the second outer side plate 23. A telescopic elongated hole 29 extending in the column axis direction X is formed in each of the first inner side plate 26 and the second inner side plate 27. The lock mechanism 19 includes an insertion shaft 40, an operation member 41, a fixed cam member 42, a first pressing member 43, a second pressing member 44, a nut 45, and an elastic member 46.

The insertion shaft 40 is a bolt, and has a shank 40a, a head 40b, and an external thread 40c. A direction in which a central axis A2 of the shank 40a extends is referred to as an insertion axis direction J. The insertion axis direction J is orthogonal to the column axis direction X and the tilt direction T. The head 40b is provided at a first end of the shank 40a in the insertion axis direction J. The external thread 40c is provided at a second end of the shank 40a in the insertion axis direction J.

The shank 40a of the insertion shaft 40 is inserted through the tilt elongated hole 25 of the first outer side plate 22, the tilt elongated hole 25 of the second outer side plate 23, the telescopic elongated hole 29 of the first inner side plate 26, and the telescopic elongated hole 29 of the second inner side plate 27. The tilt elongated hole 25 is an example of an insertion hole through which the insertion shaft 40 is inserted. The head 40b of the insertion shaft 40 is located across the first outer side plate 22 from the first inner side plate 26. The external thread 40c of the insertion shaft 40 is located across the second outer side plate 23 from the second inner side plate 27. The nut 45 engages with the external thread 40c of the insertion shaft 40.

The operation member 41, the fixed cam member 42, and the first pressing member 43 are supported by the shank 40a of the insertion shaft 40 at a part on the periphery of the head 40b. The operation member 41 is a rotationally operable lever. The operation member 41 is supported on the insertion shaft 40 so as to rotate together with the insertion shaft 40. The fixed cam member 42 is press-fitted to the shank 40a at a position adjacent to the head 40b of the insertion shaft 40 between the head 40b and the first outer side plate 22. Therefore, movement of the fixed cam member 42 in the insertion axis direction J relative to the insertion shaft 40 is restricted, and the fixed cam member 42 is rotatable together with the insertion shaft 40. The fixed cam member 42 is coupled to the operation member 41 so as to be rotatable together with the operation member 41. Therefore, when the operation member 41 is operated rotationally, the fixed cam member 42 and the insertion shaft 40 rotate together. The central axis A2 of the shank 40a of the insertion shaft 40 corresponds to a rotation center of the operation member 41.

The first pressing member 43 is externally fitted to the shank 40a at a position adjacent to the fixed cam member 42. The first pressing member 43 has a first annular portion 50 and a first tubular portion 51. The first tubular portion 51 is inserted through the tilt elongated hole 25 of the first outer side plate 22 and the telescopic elongated hole 29 of the first inner side plate 26. The first tubular portion 51 engages with at least one of the peripheral edge of the tilt elongated hole 25 of the first outer side plate 22 and the peripheral edge of the telescopic elongated hole 29 of the first inner side plate 26 so that rotation of the first tubular portion 51 relative to the upper fixed bracket 17 and the upper movable bracket 18 is restricted. The first annular portion 50 protrudes in a radial direction from the first tubular portion 51. The first annular portion 50 faces an outer side surface 22b of the first outer side plate 22.

The second pressing member 44 and the elastic member 46 are supported by the shank 40a of the insertion shaft 40 at a part on the periphery of the external thread 40c (nut 45). The second pressing member 44 is externally fitted to the shank 40a so as to be rotatable relative to the insertion shaft 40. The second pressing member 44 has a second annular portion 52 and a second tubular portion 53. The second tubular portion 53 is inserted through the tilt elongated hole 25 of the second outer side plate 23. The second tubular portion 53 engages with the peripheral edge of the tilt elongated hole 25 of the second outer side plate 23 so that rotation of the second pressing member 44 relative to the upper fixed bracket 17 is restricted. The second tubular portion 53 is not inserted through the telescopic elongated hole 29 of the second inner side plate 27, but faces a portion around the telescopic elongated hole 29 of the second inner side plate 27 in the insertion axis direction J.

The second annular portion 52 protrudes in the radial direction from the second tubular portion 53. The second annular portion 52 has a facing surface 52a that faces an outer side surface 23b. The second annular portion 52 is an example of a facing portion that faces the outer side surface 23b of the second outer side plate 23. The elastic member 46 is interposed between the facing surface 52a of the second annular portion 52 and the outer side surface 23b of the second outer side plate 23. For example, the elastic member 46 is a metal spring, such as a coned disc spring. The elastic member 46 may be a coil spring unlike this embodiment. The elastic member 46 is elastically deformable between the facing surface 52a of the second annular portion 52 and the outer side surface 23b of the second outer side plate 23. A needle roller bearing 47 and a thrust washer 48 are interposed between the second pressing member 44 and the nut 45.

The lock mechanism 19 further includes a drive mechanism 60 configured to move the second pressing member 44 so that the first pressing member 43 and the second pressing member 44 approach each other in the insertion axis direction J. For example, the drive mechanism 60 is a cam mechanism including a first cam 61 and a second cam 62. The second cam 62 engages with the first cam 61. The first cam 61 is formed on the fixed cam member 42 at a part that faces the first pressing member 43. The second cam 62 is formed on the first annular portion 50 of the first pressing member 43. In response to a rotational operation for the operation member 41, the first cam 61 can be caused to ride on the second cam 62, or the ride of the first cam 61 on the second cam 62 can be terminated.

In the unlocked state of the steering system 1 illustrated in FIG. 2, the first cam 61 does not ride on the second cam 62. During the tilt adjustment, the insertion shaft moves together with the upper movable bracket 18. At this time, the insertion shaft 40 moves in the tilt direction T inside the tilt elongated holes 25. The members supported directly or indirectly on the insertion shaft 40 (operation member 41, fixed cam member 42, first pressing member 43, second pressing member 44, nut 45, and elastic member 46) also move in the tilt direction T together with the insertion shaft 40.

Movement of the insertion shaft 40 in the column axis direction X relative to the upper fixed bracket 17 is restricted. Accordingly, the upper jacket 7 moves in the column axis direction X relative to the insertion shaft 40 during telescopic adjustment. At this time, the insertion shaft 40 moves relatively in the column axis direction X inside the telescopic elongated holes 29. After the telescopic adjustment and the tilt adjustment, the operation member 41 is operated rotationally to cause the first cam 61 to ride on the second cam 62 as illustrated in FIG. 3. At this time, the fixed cam member 42 and the insertion shaft 40 move in the insertion axis direction J relative to the first pressing member 43. Therefore, the distance between the head 40b of the insertion shaft 40 and the first pressing member 43 is increased, and the second pressing member 44 is pulled toward the first pressing member 43 together with the nut 45. Thus, the first pressing member 43 and the second pressing member 44 approach each other in the insertion axis direction J. An operation load necessary for the rotational operation for the operation member 41 is thus converted to an axial force for causing the first pressing member 43 and the second pressing member 44 to approach each other in the insertion axis direction J.

By causing the first pressing member 43 and the second pressing member 44 to approach each other, the first pressing member 43 presses the first outer side plate 22 toward the first inner side plate 26. The first outer side plate 22 is thus pushed against the first inner side plate 26. The second pressing member 44 directly presses the second inner side plate 27 through the tilt elongated hole 25 without intermediation of the second outer side plate 23. The second inner side plate 27 is coupled to the first inner side plate 26 via the coupling plate 28 and the upper jacket 7. Therefore, when the second pressing member 44 presses the second inner side plate 27, the first inner side plate 26 is pushed against the first outer side plate 22.

When the first inner side plate 26 and the first outer side plate 22 are pushed against each other, friction is caused between the first inner side plate 26 and the first outer side plate 22. Movement of the upper movable bracket 18 in the tilt direction T and the column axis direction X relative to the upper fixed bracket 17 is restricted by this friction between the first inner side plate 26 and the first outer side plate 22. That is, movement of the column jacket 4 relative to the upper fixed bracket 17 is restricted. As a result, tilt locking and telescopic locking are achieved.

The position of the column jacket 4 relative to the upper fixed bracket 17 is locked as described above. In the first embodiment, the position of the column jacket 4 relative to the upper fixed bracket 17 can be locked without holding the upper movable bracket 18 between the first outer side plate 22 and the second outer side plate 23 of the upper fixed bracket 17. A difference in the operation load on the operation member 41 due to the position of the column jacket 4 after the tilt adjustment can thus be reduced.

When the second pressing member 44 presses the second inner side plate 27, the elastic member 46 is elastically deformed between the second annular portion 52 of the second pressing member 44 and the second outer side plate 23. Therefore, the elastic member 46 can fill a clearance between the second outer side plate 23 and the second annular portion 52 of the second pressing member 44 while the second pressing member 44 securely keeps pressing the second inner side plate 27. The support rigidity can thus be improved while the difference in the operation load on the operation member 41 due to the position of the column jacket 4 after the tilt adjustment can be reduced.

In order to reduce the difference in the operation load on the operation member 41 due to the position of the column jacket 4 after the tilt adjustment, it is preferable that a repulsive force received from the elastic member 46 when the operation member 41 is operated rotationally be constant irrespective of the position of the column jacket 4 after the tilt adjustment. In order to achieve the constant repulsive force, it is preferable that a difference between a distance between the outer side surface 22b of the first outer side plate 22 and the outer side surface 23b of the second outer side plate 23 in the locked state (first distance D1) and a distance between the outer side surface 22b of the first outer side plate 22 and the facing surface 52a of the second annular portion 52 in the locked state (second distance D2) be constant irrespective of the position of the column jacket 4 in the tilt direction T.

In the first embodiment, the elastic member 46 is a coned disc spring. Therefore, the amount of variation in the repulsive force when the amount of elastic deformation of the elastic member 46 varies is smaller than that in a case where the elastic member 46 is a coil spring. That is, the stable range of the repulsive force of the elastic member 46 is wide. Thus, a change in the difference between the first distance D1 and the second distance D2 due to the position of the column jacket 4 in the tilt direction T can be permitted as compared to the case where the elastic member 46 is a coil spring. In the first embodiment, the first pressing member 43 and the second pressing member 44 can be caused to approach each other by the drive mechanism 60 having a simple structure, namely, the engagement of the first cam 61 and the second cam 62.

Second Embodiment

Figure 4:
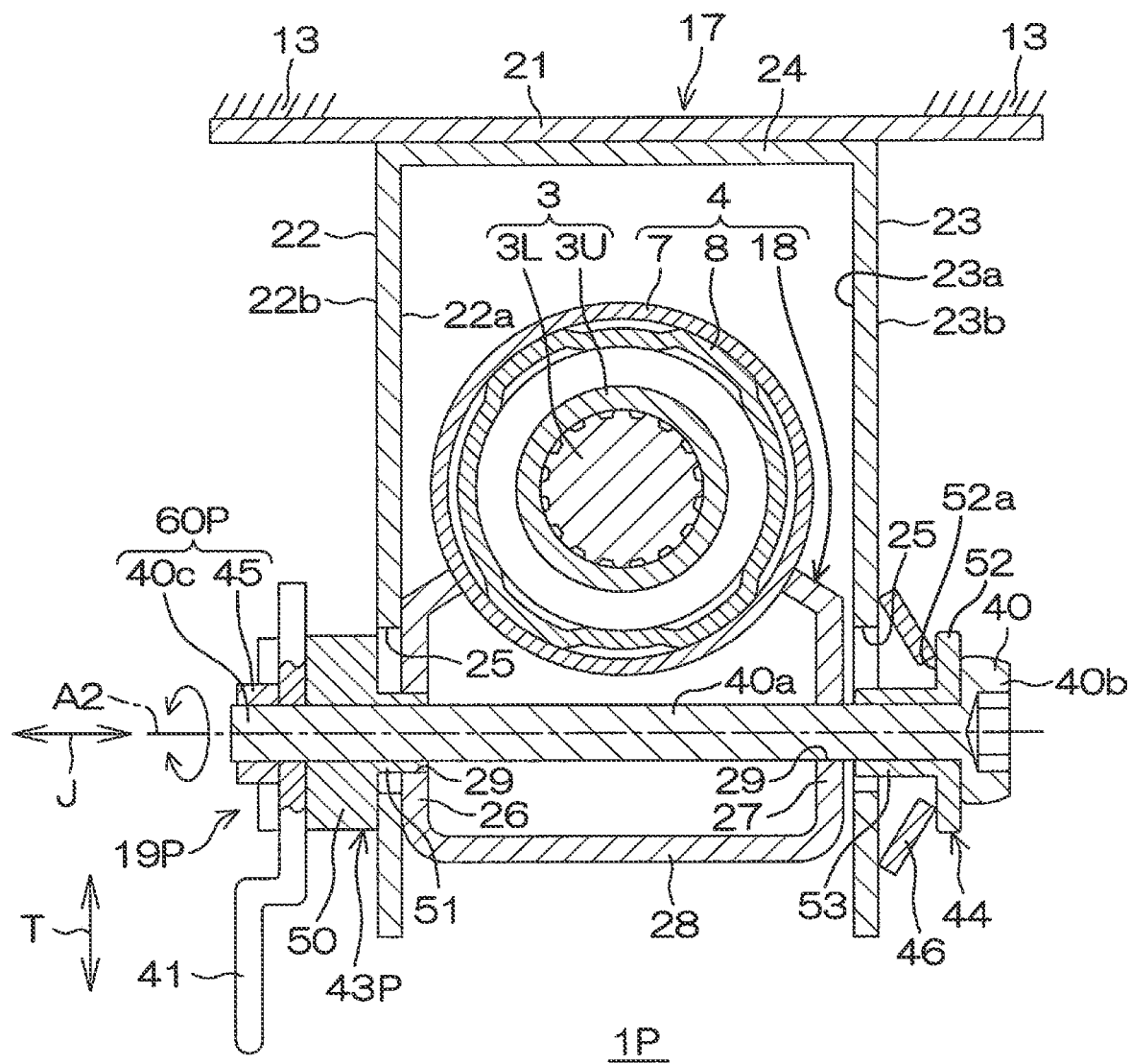
FIG. 4 is a sectional view of a steering system on the periphery of a lock mechanism according to a second embodiment of the present disclosure, illustrating an unlocked state of the steering system.
Figure 5:
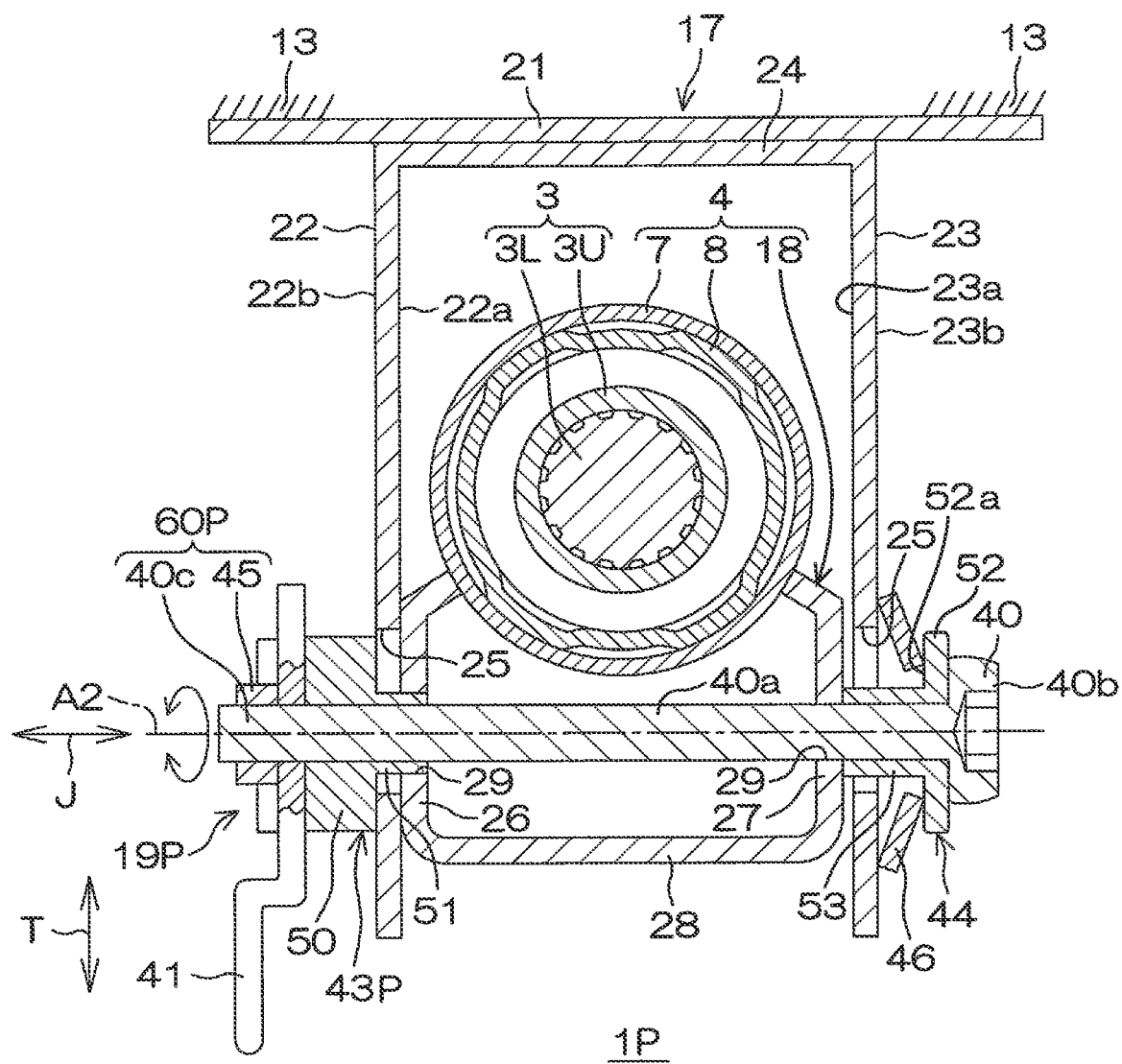
FIG. 5 is a sectional view of the steering system on the periphery of the lock mechanism according to the second embodiment, illustrating a locked state of the steering system.

Next, a steering system 1P according to a second embodiment is described. FIGS. 4 and 5 are sectional views of the periphery of a lock mechanism 19P of the steering system 1P. FIG. 4 is a view illustrating an unlocked state of the steering system 1P. FIG. is a view illustrating a locked state of the steering system 1P.

The steering system 1P is mainly different from the steering system 1 of the first embodiment in that a drive mechanism 60P of the lock mechanism 19P is constituted by the external thread 40c of the insertion shaft 40 and the nut 45. The lock mechanism 19P of the steering system 1P is described below in detail. In FIGS. 4 and 5, the same members as those described above are denoted with the same reference characters and description thereof is omitted.

The lock mechanism 19P includes the insertion shaft 40, the operation member 41, a first pressing member 43P, the second pressing member 44, the nut 45, and the elastic member 46. The head 40b of the insertion shaft 40 is located across the second outer side plate 23 from the second inner side plate 27. The external thread 40c of the insertion shaft 40 is located across the first outer side plate 22 from the first inner side plate 26.

The operation member 41 and the first pressing member 43P are supported by the shank 40a of the insertion shaft 40 at a part on the periphery of the external thread 40c (nut 45). The second pressing member 44 and the elastic member 46 are supported by the shank 40a of the insertion shaft 40 at a part on the periphery of the head 40b. The operation member 41 is externally fitted to the shank 40a at a position adjacent to the nut 45. The operation member 41 is coupled to the nut 45 so as to be rotatable together with the nut 45. The first pressing member 43P is externally fitted to the shank 40a at a position adjacent to the operation member 41. The first pressing member 43P is a spacer interposed between the operation member 41 and the first outer side plate 22. No cam is formed on the first annular portion 50 of the first pressing member 43P.

Rotation of the insertion shaft 40 relative to the upper fixed bracket 17 and the upper movable bracket 18 is restricted. For example, the insertion shaft 40 engages with at least one of the peripheral edge of the telescopic elongated hole 29 of the second inner side plate 27, the inner peripheral surface of the first tubular portion 51 of the first pressing member 43P, and the inner peripheral surface of the second tubular portion 53 of the second pressing member 44, so that the rotation of the insertion shaft 40 relative to the upper fixed bracket 17 and the upper movable bracket 18 is restricted. Alternatively, the rotation of the insertion shaft 40 relative to the upper fixed bracket 17 and the upper movable bracket 18 may be restricted by fixing the head 40b of the insertion shaft 40 to the second annular portion 52 of the second pressing member 44.

Since the rotation of the insertion shaft 40 is restricted, the insertion shaft moves in the insertion axis direction J when the nut 45 is rotated in response to the rotational operation for the operation member 41. The head 40b of the insertion shaft 40 can thus be moved toward or away from the nut 45. When the operation member 41 is operated rotationally in a locking direction to move the insertion shaft 40 in the insertion axis direction J after the telescopic adjustment and the tilt adjustment, the head 40b of the insertion shaft 40 and the nut 45 approach each other as illustrated in FIG. 5. Therefore, the second pressing member 44 is pulled toward the first pressing member 43P together with the head 40b of the insertion shaft 40. The first pressing member 43P and the second pressing member 44 thus approach each other in the insertion axis direction J.

By causing the first pressing member 43P and the second pressing member 44 to approach each other, the first pressing member 43P presses the first outer side plate 22 toward the first inner side plate 26. The first outer side plate 22 is thus pushed against the first inner side plate 26. The second pressing member 44 directly presses the second inner side plate 27 through the tilt elongated hole 25 without intermediation of the second outer side plate 23. The second inner side plate 27 is coupled to the first inner side plate 26 via the coupling plate 28 and the upper jacket 7. Therefore, when the second pressing member 44 presses the second inner side plate 27, the first inner side plate 26 is pushed against the first outer side plate 22.

When the first inner side plate 26 and the first outer side plate 22 are pushed against each other, friction is caused between the first inner side plate 26 and the first outer side plate 22. Movement of the upper movable bracket 18 in the tilt direction T and the column axis direction X relative to the upper fixed bracket 17 is restricted by this friction between the first inner side plate 26 and the first outer side plate 22. That is, movement of the column jacket 4 relative to the upper fixed bracket 17 is restricted. As a result, tilt locking and telescopic locking are achieved.

The position of the column jacket 4 relative to the upper fixed bracket 17 is locked as described above. With the structure of the second embodiment as well, the position of the column jacket 4 relative to the upper fixed bracket 17 can be locked without holding the upper movable bracket 18 between the first outer side plate 22 and the second outer side plate 23 of the upper fixed bracket 17. The difference in the operation load on the operation member 41 due to the position of the column jacket 4 after the tilt adjustment can thus be reduced.

Figure 6:
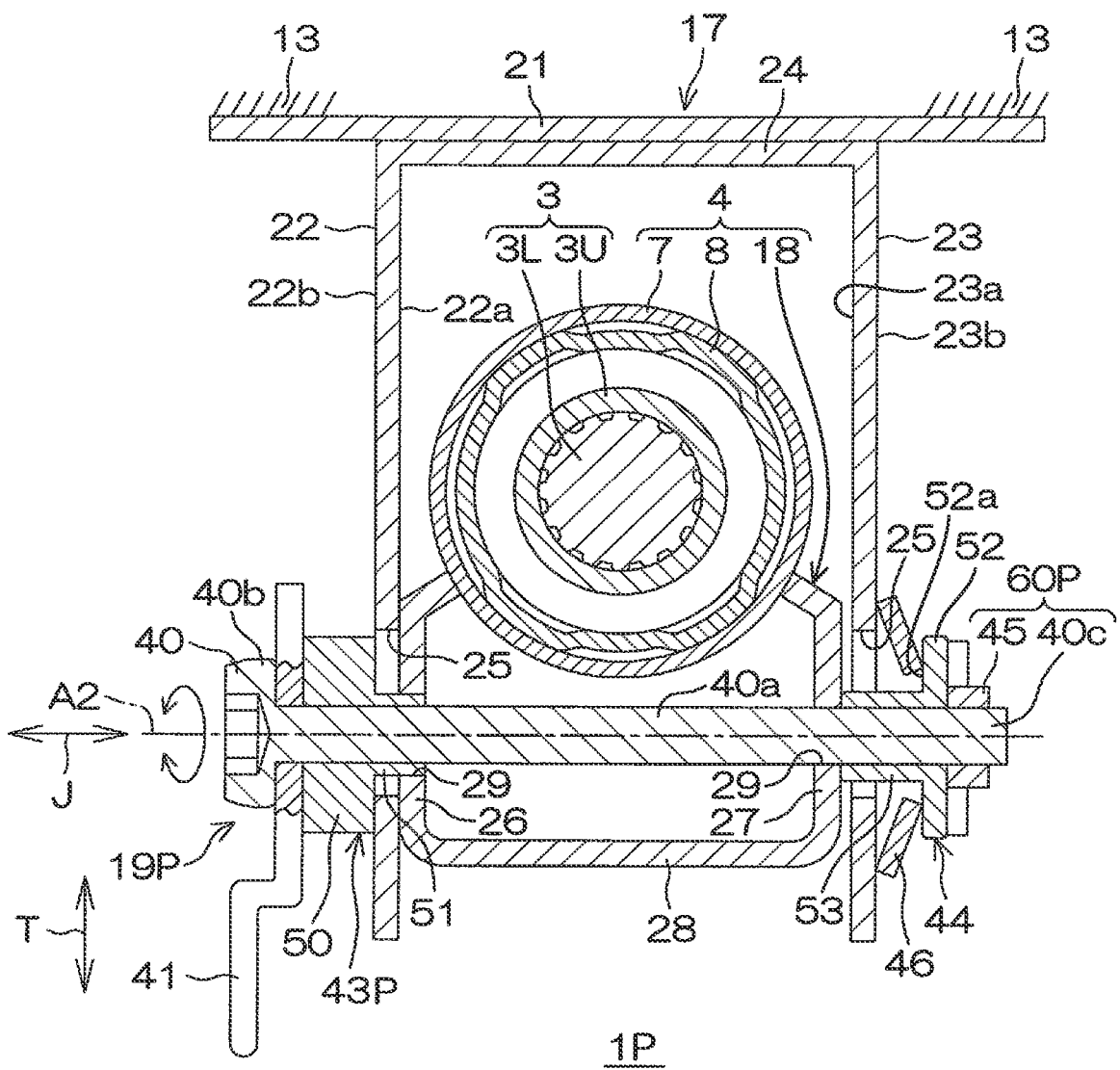
FIG. 6 is a sectional view illustrating a modified example of the steering system according to the second embodiment.

The drive mechanism 60P is constituted by the external thread 40c of the insertion shaft 40 and the nut 45. Therefore, the first pressing member 43P and the second pressing member 44 can be caused to approach each other by using a simple structure, namely, the engagement of the bolt (insertion shaft 40) and the nut 45. In the second embodiment, the head 40b of the insertion shaft 40 is located across the second outer side plate 23 from the second inner side plate 27, and the external thread 40c of the insertion shaft 40 is located across the first outer side plate 22 from the first inner side plate 26. As in a modified example illustrated in FIG. 6, however, the direction of the insertion shaft 40 may be reversed. That is, the head 40b of the insertion shaft 40 may be located across the first outer side plate 22 from the first inner side plate 26, and the external thread 40c of the insertion shaft 40 may be located across the second outer side plate 23 from the second inner side plate 27.

In this modified example, the head 40b of the insertion shaft 40 is fixed to the operation member 41, and the insertion shaft 40 is rotatable relative to the upper fixed bracket 17 and the upper movable bracket 18. The nut 45 is fixed to the second pressing member 44, so that rotation of the nut 45 relative to the upper fixed bracket 17 and the upper movable bracket 18 is restricted. Therefore, the nut 45 moves in the insertion axis direction J when the insertion shaft 40 is rotated in response to the rotational operation for the operation member 41. The nut 45 can thus be moved toward or away from the head 40b of the insertion shaft 40.

When the operation member 41 is operated rotationally in the locking direction to move the nut 45 in the insertion axis direction J after the telescopic adjustment and the tilt adjustment, the head 40b of the insertion shaft 40 and the nut 45 approach each other. Therefore, the second pressing member 44 is pulled toward the first pressing member 43P together with the nut 45. The first pressing member 43P and the second pressing member 44 thus approach each other in the insertion axis direction J.

Third Embodiment

Figure 7:
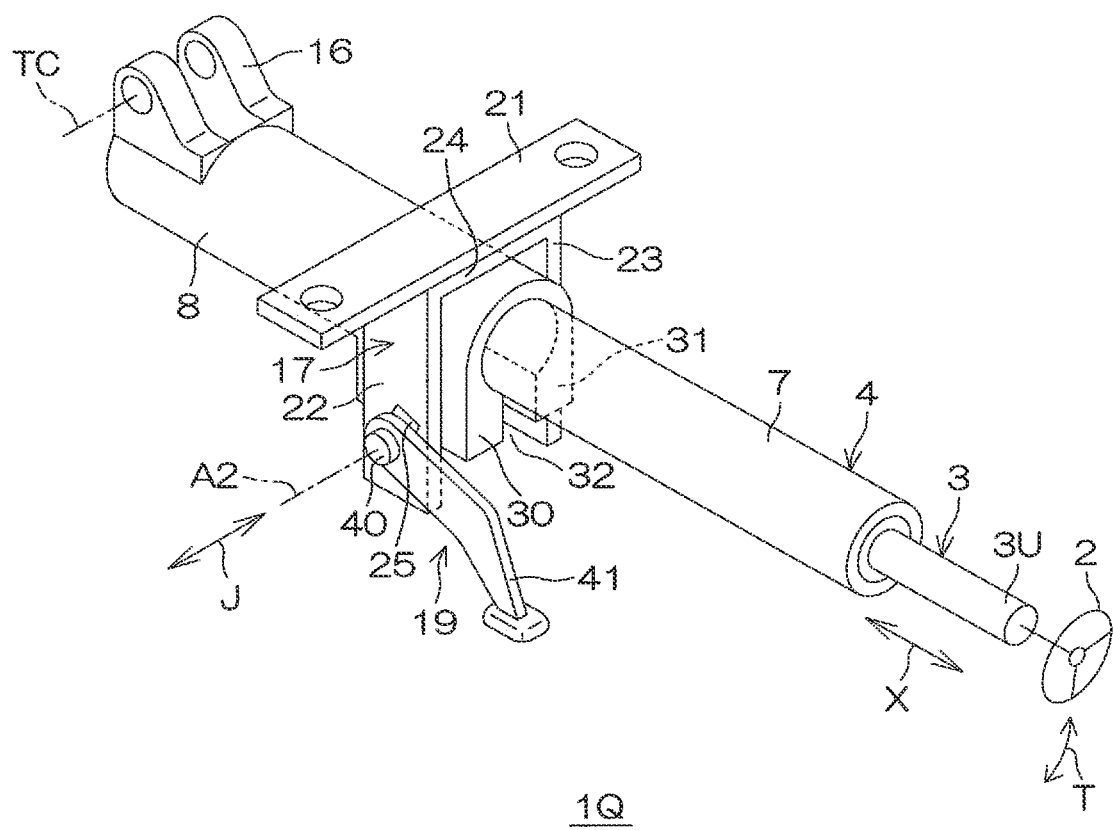
FIG. 7 is a perspective view of a steering system according to a third embodiment of the present disclosure.
Figure 8:
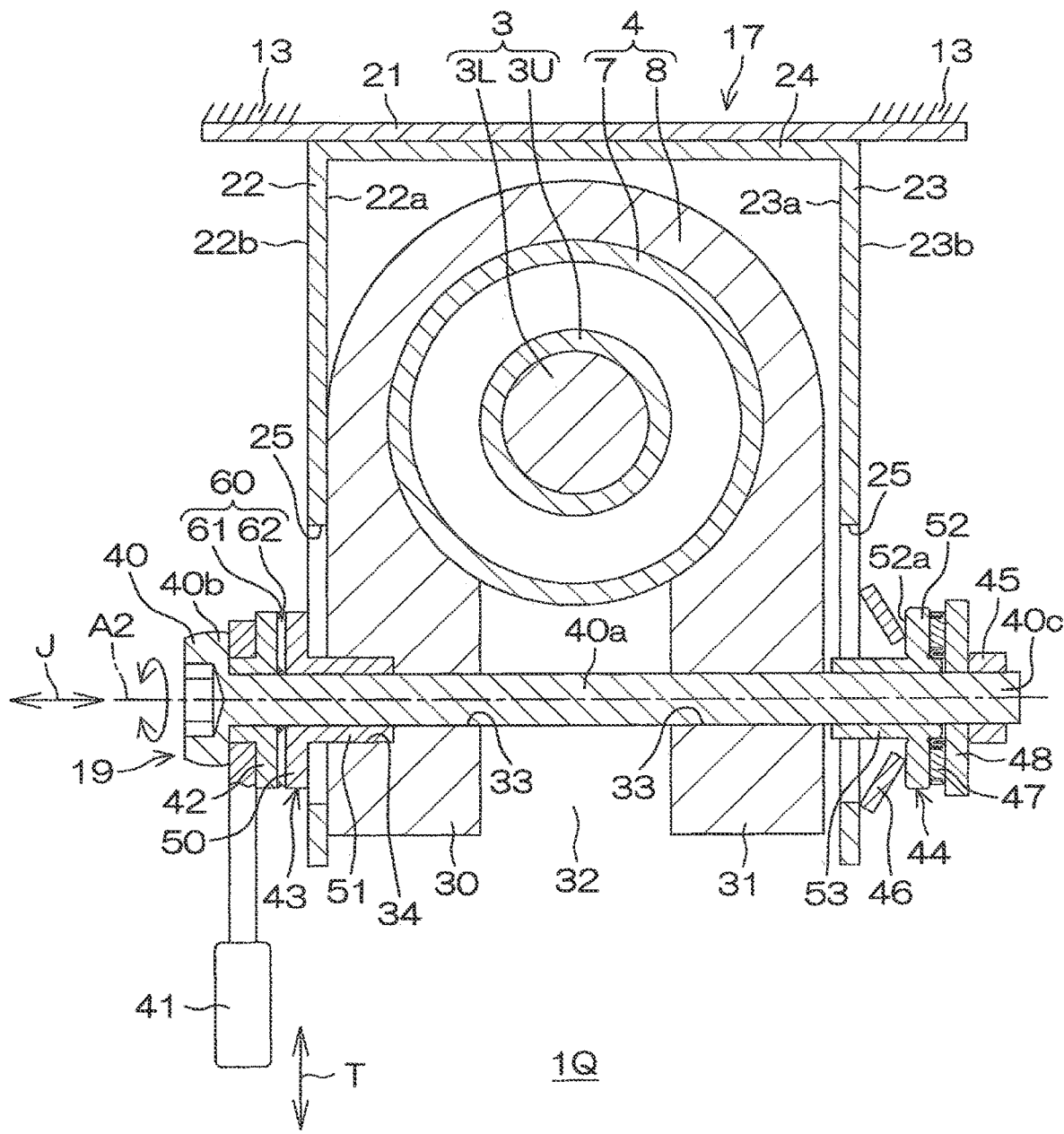
FIG. 8 is a sectional view of the steering system on the periphery of a lock mechanism according to the third embodiment, illustrating an unlocked state of the steering system.
Figure 9:
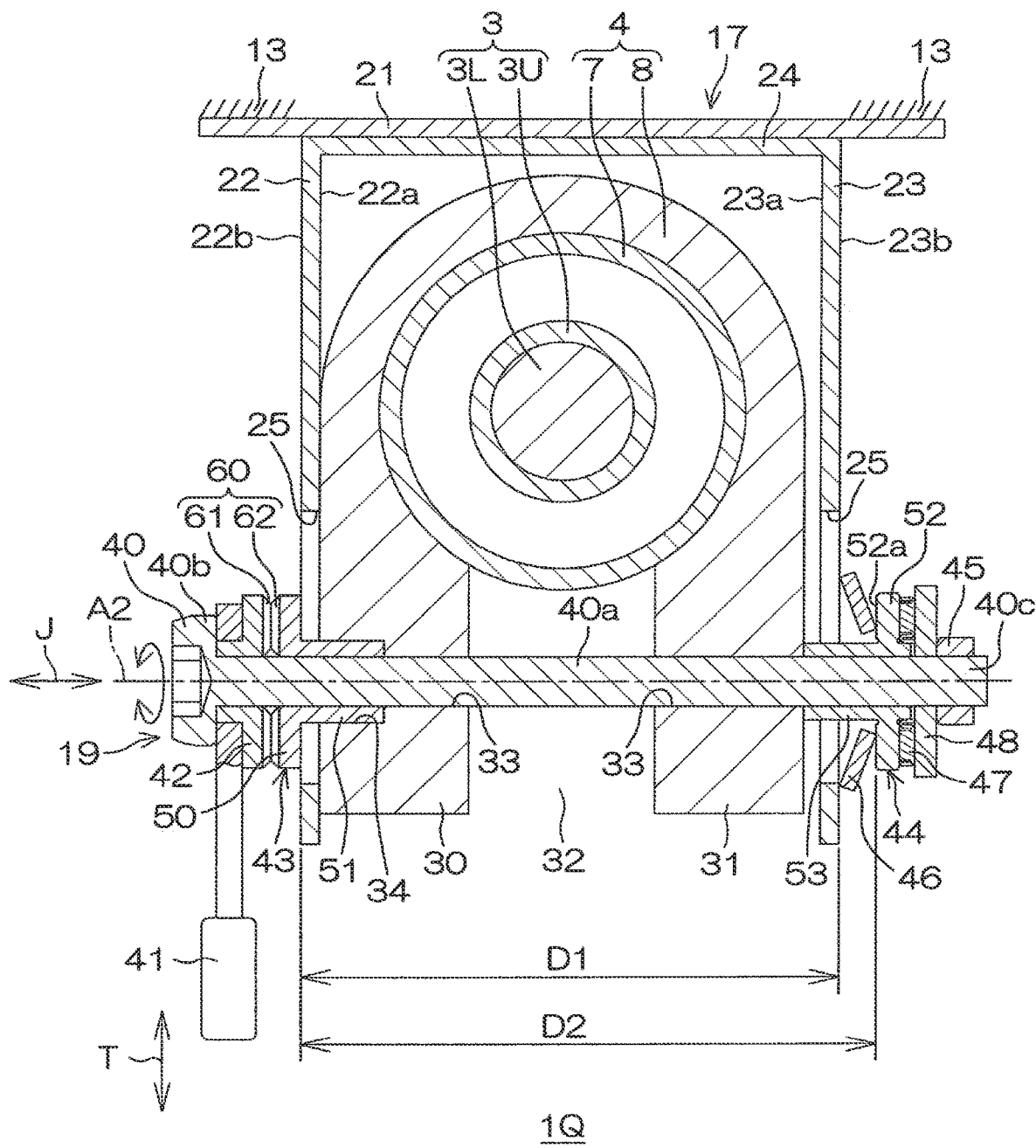
FIG. 9 is a sectional view of the steering system on the periphery of the lock mechanism according to the third embodiment, illustrating a locked state of the steering system.

Next, a steering system 1Q according to a third embodiment is described. FIG. 7 is a perspective view of the steering system 1Q. FIGS. 8 and 9 are sectional views of the periphery of the lock mechanism 19 of the steering system 1Q. FIG. 8 is a view illustrating an unlocked state of the steering system 1Q. FIG. 9 is a view illustrating a locked state of the steering system 1Q.

As shown in FIG. 7, the steering system 1Q is mainly different from the steering system 1 of the first embodiment in that the column jacket 4 includes a first support portion 30 and a second support portion 31 instead of the upper movable bracket 18. In FIGS. 7 to 9, the same members as those described above are denoted with the same reference characters and description thereof is omitted. Referring to FIG. 8, the column jacket 4 according to the third embodiment includes the first support portion 30 and the second support portion 31 in addition to the upper jacket 7 and the lower jacket 8. The lower jacket 8 according to the first embodiment is internally fitted to the upper jacket 7 (see FIG. 2), whereas the lower jacket 8 according to the third embodiment is externally fitted to the upper jacket 7.

The first support portion 30 and the second support portion 31 are formed integrally with the lower jacket 8 and support the insertion shaft 40. The first support portion 30 and the second support portion 31 face each other in the insertion axis direction J. Both the first support portion 30 and the second support portion 31 are generally in the shape of a rectangular parallelepiped whose longitudinal direction corresponds to the column axis direction X. The first support portion 30 and the second support portion 31 are disposed between the first outer side plate 22 and the second outer side plate 23.

A slit 32 is formed between the first support portion 30 and the second support portion 31. The slit 32 extends downward in the column axis direction X from the upper axial end of the lower jacket 8. When the slit 32 is narrowed, the lower jacket 8 can be elastically reduced in diameter. The head 40b of the insertion shaft 40 is located across the first outer side plate 22 from the first support portion 30. The external thread 40c of the insertion shaft 40 is located across the second outer side plate 23 from the second support portion 31. The operation member 41, the fixed cam member 42, and the first pressing member 43 are supported by the shank 40a of the insertion shaft 40 at a part on the periphery of the head 40b. The second pressing member 44, the elastic member 46, the needle roller bearing 47 and the thrust washer 48 are supported by the shank 40a of the insertion shaft 40 at a part on the periphery of the external thread 40c (nut 45).

A circular hole 33 through which the insertion shaft 40 is inserted is formed in each of the first support portion 30 and the second support portion 31. Since the insertion shaft 40 is inserted through the circular holes 33, the insertion shaft 40 moves together with the lower jacket 8 during the tilt adjustment and the telescopic adjustment. A fitting hole 34 in which the first tubular portion 51 of the first pressing member 43 is fitted is formed in the first support portion 30. The fitting hole 34 is a bottomed hole formed by recessing an outer side surface 30a of the first support portion 30. The circular hole 33 of the first support portion 30 extends through the first support portion 30 between the bottom surface of the fitting hole 34 and an inner side surface of the first support portion 30. The first tubular portion 51 is inserted through the tilt elongated hole 25 of the first outer side plate 22 and the fitting hole 34 of the first support portion 30. Since the first tubular portion 51 is fitted in the fitting hole 34, rotation of the first pressing member 43 relative to the upper fixed bracket 17 and the first support portion 30 is restricted.

The second tubular portion 53 of the second pressing member 44 is inserted through the tilt elongated hole 25 of the second outer side plate 23. The second tubular portion 53 engages with the peripheral edge of the tilt elongated hole 25 of the second outer side plate 23 so that rotation of the second pressing member 44 relative to the upper fixed bracket 17 is restricted. The second tubular portion 53 is not inserted through the circular hole 33 of the second support portion 31, but faces a portion around the circular hole 33 of the second support portion 31 in the insertion axis direction J.

In the unlocked state of the steering system 1Q illustrated in FIG. 8, the first cam 61 does not ride on the second cam 62. During the tilt adjustment, the insertion shaft 40 moves together with the lower jacket 8. At this time, the insertion shaft 40 moves in the tilt direction T inside the tilt elongated holes 25. The members supported directly or indirectly on the insertion shaft 40 (operation member 41, fixed cam member 42, first pressing member 43, second pressing member 44, nut 45, and elastic member 46) also move in the tilt direction T together with the insertion shaft 40 during the tilt adjustment.

After the telescopic adjustment and the tilt adjustment, the operation member 41 is operated rotationally in the locking direction to cause the first cam 61 to ride on the second cam 62 as illustrated in FIG. 9. At this time, the fixed cam member 42 and the insertion shaft 40 move in the insertion axis direction J relative to the first pressing member 43. Therefore, the distance between the head 40b of the insertion shaft 40 and the first pressing member 43 is increased, and the second pressing member 44 is pulled toward the first pressing member 43 together with the nut 45. The first pressing member 43 and the second pressing member 44 thus approach each other in the insertion axis direction J. An operation load necessary for the rotational operation for the operation member 41 is thus converted to an axial force for causing the first pressing member 43 and the second pressing member 44 to approach each other in the insertion axis direction J.

By causing the first pressing member 43 and the second pressing member 44 to approach each other, the first pressing member 43 presses the first outer side plate 22 toward the first support portion 30. The first outer side plate 22 is thus pushed against the first support portion 30. The second pressing member 44 directly presses the second support portion 31 through the tilt elongated hole 25 without intermediation of the second outer side plate 23. The second support portion 31 and the first support portion 30 are coupled together via the lower jacket 8. Therefore, when the second pressing member 44 presses the second support portion 31, the first support portion 30 is pushed against the first outer side plate 22. The lower jacket 8 of the column jacket 4 is thus pushed against the first outer side plate 22.

When the first support portion 30 and the first outer side plate 22 are pushed against each other, friction is caused between the first support portion 30 and the first outer side plate 22. Movement of the lower jacket 8 in the tilt direction T relative to the upper fixed bracket 17 is restricted by this friction between the first support portion 30 and the first outer side plate 22. That is, tilt locking is achieved. When the first pressing member 43 presses the first outer side plate 22 toward the first support portion 30 and the second pressing member 44 presses the second support portion 31, the width of the slit 32 between the first support portion 30 and the second support portion 31 is reduced. The lower jacket 8 is thus elastically reduced in diameter, thereby tightly holding the upper jacket 7. Movement of the upper jacket 7 relative to the lower jacket 8 is thus restricted. That is, telescopic locking is achieved.

The position of the column jacket 4 relative to the upper fixed bracket 17 is locked as described above. The third embodiment has effects similar to those of the first embodiment. Specifically, in the third embodiment as well, the position of the column jacket 4 relative to the upper fixed bracket 17 can be locked without holding the column jacket 4 between the first outer side plate 22 and the second outer side plate 23 of the upper fixed bracket 17. The difference in the operation load on the operation member 41 due to the position of the column jacket 4 after the tilt adjustment can thus be reduced.

In the third embodiment, as described above, the first pressing member 43 presses the first outer side plate 22 toward the first support portion 30 and the second pressing member 44 presses the second support portion 31, whereby the lower jacket 8 is elastically reduced in diameter. Accordingly, an axial force that is required to appropriately reduce the diameter of the lower jacket 8 varies depending on where in the tilt direction T the first pressing member 43 and the second pressing member 44 presses on the first support portion 30 and the second support portion 31.

In the third embodiment, however, since the insertion shaft 40 is inserted through the circular holes 33, the first pressing member 43 and the second pressing member 44 press the same position on the first support portion 30 and the second support portion 31 even if the tilt position is changed. The axial force that is required to appropriately reduce the diameter of the lower jacket 8 is therefore likely to be constant irrespective of the position of the column jacket 4 after the tilt adjustment. Accordingly, even in the steering system 1Q in which the first support portion 30 and the second support portion 31 are provided instead of the upper movable bracket 18, the difference in the operation load on the operation member 41 due to the position of the column jacket 4 after the tilt adjustment can be reduced as in the steering system 1 according to the first embodiment.

When the second pressing member 44 presses the second support portion 31, the elastic member 46 is elastically deformed between the second annular portion 52 of the second pressing member 44 and the second outer side plate 23. Therefore, the elastic member 46 can fill a clearance between the second outer side plate 23 and the second annular portion 52 of the second pressing member 44 while the second pressing member 44 securely keeps pressing the second support portion 31. The support rigidity can thus be improved while the difference in the operation load on the operation member 41 due to the position of the column jacket 4 after the tilt adjustment can be reduced.

In order to reduce the difference in the operation load on the operation member 41 due to the position of the column jacket 4 after the tilt adjustment, it is preferable that a repulsive force received from the elastic member 46 when the operation member 41 is operated rotationally be constant irrespective of the position of the column jacket 4 after the tilt adjustment. In order to achieve the constant repulsive force, it is preferable that the difference between the distance between the outer side surface 22b of the first outer side plate 22 and the outer side surface 23b of the second outer side plate 23 in the locked state (first distance D1) and the distance between the outer side surface 22b of the first outer side plate 22 and the facing surface 52a of the second annular portion 52 in the locked state (second distance D2) be constant irrespective of the position of the column jacket 4 in the tilt direction T.

In the third embodiment, the elastic member 46 is a coned disc spring. Therefore, the amount of variation in the repulsive force when the amount of elastic deformation of the elastic member 46 varies is smaller than that in a case where the elastic member 46 is a coil spring. That is, the stable range of the repulsive force of the elastic member 46 is wide. Thus, a change in the difference between the first distance D1 and the second distance D2 due to the position of the column jacket 4 in the tilt direction T can be permitted as compared to the case where the elastic member 46 is a coil spring. In the third embodiment, the first pressing member 43 and the second pressing member 44 can be caused to approach each other by the drive mechanism 60 having a simple structure, namely, the engagement of the first cam 61 and the second cam 62.

Fourth Embodiment

Next, a steering system 1R according to a fourth embodiment is described. The steering system 1R is mainly different from the steering system 1Q of the third embodiment in that the lock mechanism 19P according to the second embodiment is used as a lock mechanism. That is, the drive mechanism 60P constituted by the external thread 40c of the insertion shaft 40 and the nut 45 is used as a drive mechanism according to the fourth embodiment.

Figure 10:
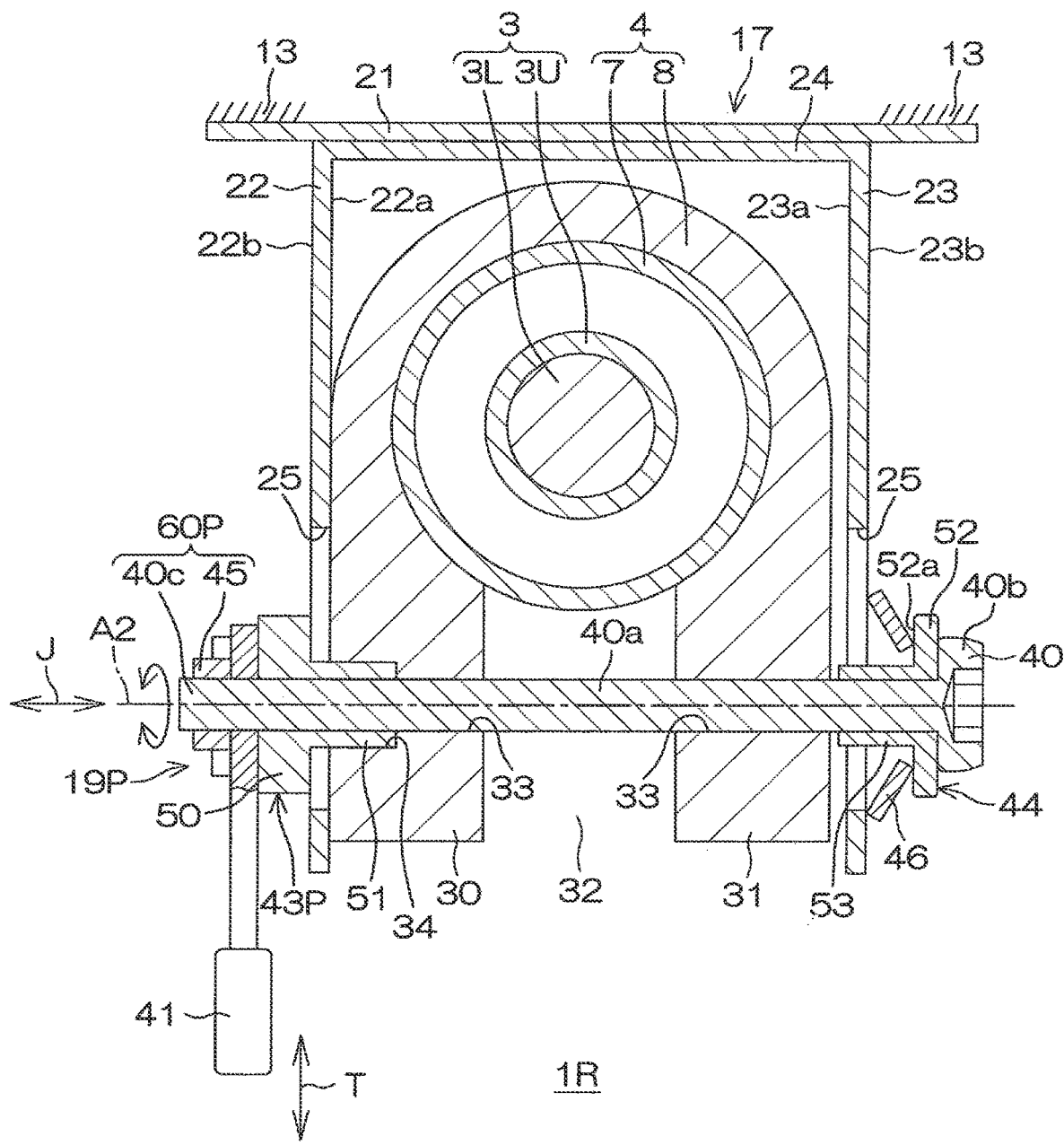
FIG. 10 is a sectional view of a steering system on the periphery of a lock mechanism according to a fourth embodiment of the present disclosure, illustrating an unlocked state of the steering system.
Figure 11:
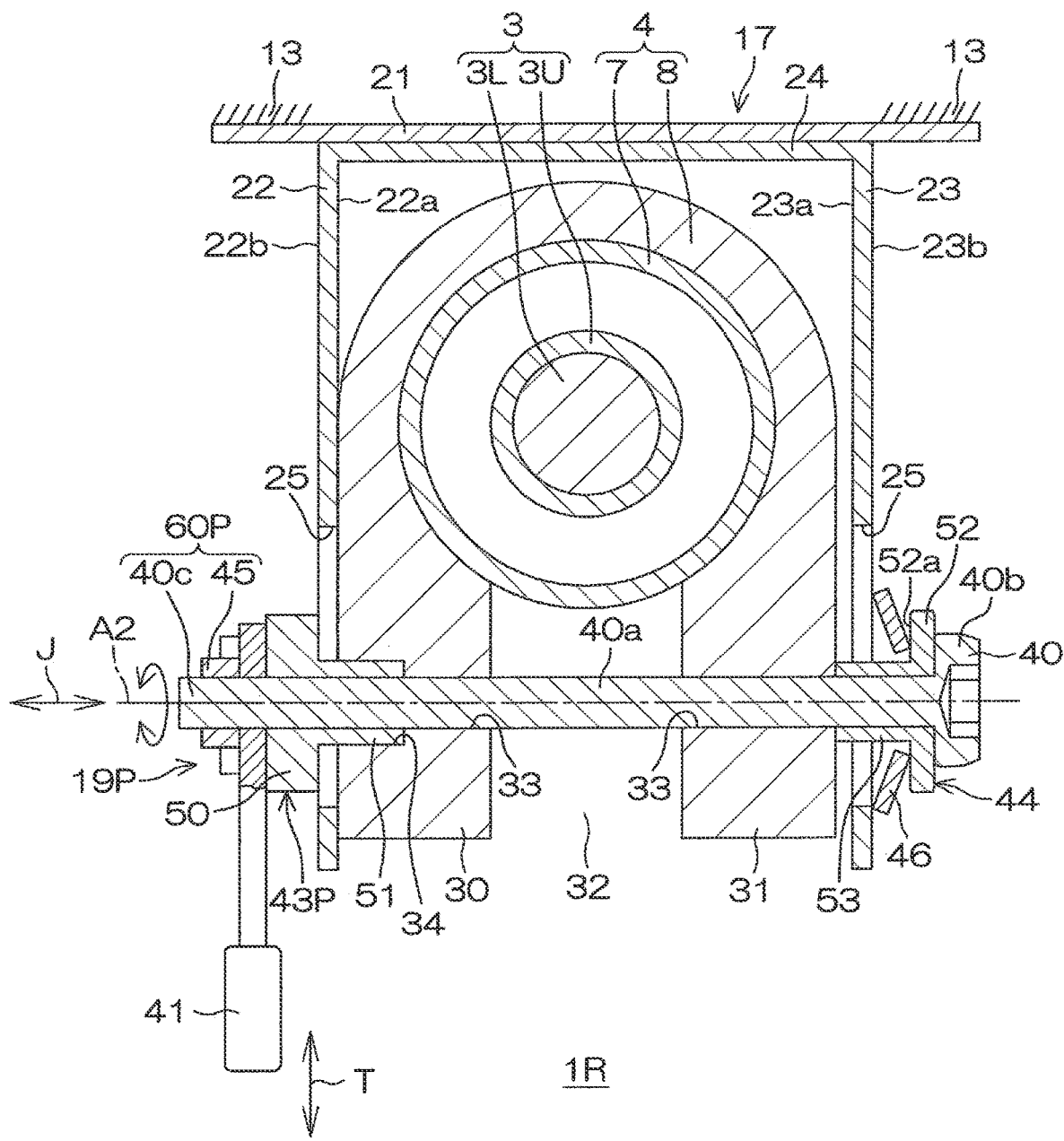
FIG. 11 is a sectional view of the steering system on the periphery of the lock mechanism according to the fourth embodiment, illustrating a locked state of the steering system.

FIGS. 10 and 11 are sectional views of the periphery of the lock mechanism 19P of the steering system 1R. FIG. 10 is a view illustrating an unlocked state of the steering system 1R. FIG. 11 is a view illustrating a locked state of the steering system 1R. In FIGS. 10 and 11, the same members as those described above are denoted with the same reference characters and description thereof is omitted. The head 40b of the insertion shaft 40 is located across the second outer side plate 23 from the second support portion 31. The external thread 40c of the insertion shaft 40 is located across the first outer side plate 22 from the first support portion 30.

The insertion shaft 40 engages with at least one of the inner peripheral surface of the circular hole 33 of the first support portion 30, the inner peripheral surface of the circular hole 33 of the second support portion 31, the inner peripheral surface of the first tubular portion 51 of the first pressing member 43P, and the inner peripheral surface of the second tubular portion 53 of the second pressing member 44. Accordingly, rotation of the insertion shaft 40 relative to the upper fixed bracket 17 and the column jacket 4 is restricted. Alternatively, rotation of the insertion shaft 40 relative to the upper fixed bracket 17 and the first and second support portions 30, 31 may be restricted by fixing the head 40b of the insertion shaft 40 to the second annular portion 52 of the second pressing member 44.

Since the rotation of the insertion shaft 40 is restricted, the insertion shaft moves in the insertion axis direction J when the nut 45 is rotated in response to the rotational operation for the operation member 41. The head 40b of the insertion shaft 40 can thus be moved toward or away from the nut 45. When the operation member 41 is operated rotationally in the locking direction to move the insertion shaft 40 in the insertion axis direction J after the telescopic adjustment and the tilt adjustment, the head 40b of the insertion shaft 40 and the nut 45 approach each other as illustrated in FIG. 11. Therefore, the second pressing member 44 is pulled toward the first pressing member 43P together with the head 40b of the insertion shaft 40. The first pressing member 43P and the second pressing member 44 thus approach each other in the insertion axis direction J.

By causing the first pressing member 43P and the second pressing member 44 to approach each other, the first pressing member 43P presses the first outer side plate 22 toward the first support portion 30. The first outer side plate 22 is thus pushed against the first support portion 30. The second pressing member 44 directly presses the second support portion 31 through the tilt elongated hole 25 without intermediation of the second outer side plate 23. When the second pressing member 44 presses the second support portion 31, the first support portion 30 is pushed against the first outer side plate 22. The lower jacket 8 of the column jacket 4 is thus pushed against the first outer side plate 22.

When the first support portion 30 and the first outer side plate 22 are pushed against each other, friction is caused between the first support portion 30 and the first outer side plate 22. Movement of the lower jacket 8 in the tilt direction T relative to the upper fixed bracket 17 is restricted by this friction between the first support portion 30 and the first outer side plate 22. That is, tilt locking is achieved. When the first pressing member 43P presses the first outer side plate 22 toward the first support portion 30 and the second pressing member 44 presses the second support portion 31, the width of the slit 32 between the first support portion 30 and the second support portion 31 is reduced. The lower jacket 8 is thus elastically reduced in diameter, thereby tightly holding the upper jacket 7. Movement of the upper jacket 7 relative to the lower jacket 8 is thus restricted. That is, telescopic locking is achieved.

The position of the column jacket 4 relative to the upper fixed bracket 17 is locked as described above. The fourth embodiment has effects similar to those of the second embodiment. Specifically, in the structure of the fourth embodiment as well, the position of the column jacket 4 relative to the upper fixed bracket 17 can be locked without holding the column jacket 4 between the first outer side plate 22 and the second outer side plate 23 of the upper fixed bracket 17. The difference in the operation load on the operation member 41 due to the position of the column jacket 4 after the tilt adjustment can thus be reduced.

Since the insertion shaft 40 is inserted through the circular holes 33, the first pressing member 43P and the second pressing member 44 press the same position on the first support portion 30 and the second support portion 31 even if the tilt position is changed. An axial force that is required to appropriately reduce the diameter of the lower jacket 8 is therefore likely to be constant irrespective of the position of the column jacket 4 after the tilt adjustment. Accordingly, even in the steering system 1R in which the first support portion 30 and the second support portion 31 are provided instead of the upper movable bracket 18, the difference in the operation load on the operation member 41 due to the position of the column jacket 4 after the tilt adjustment can be reduced as in the steering system 1P of the second embodiment.

Figure 12:
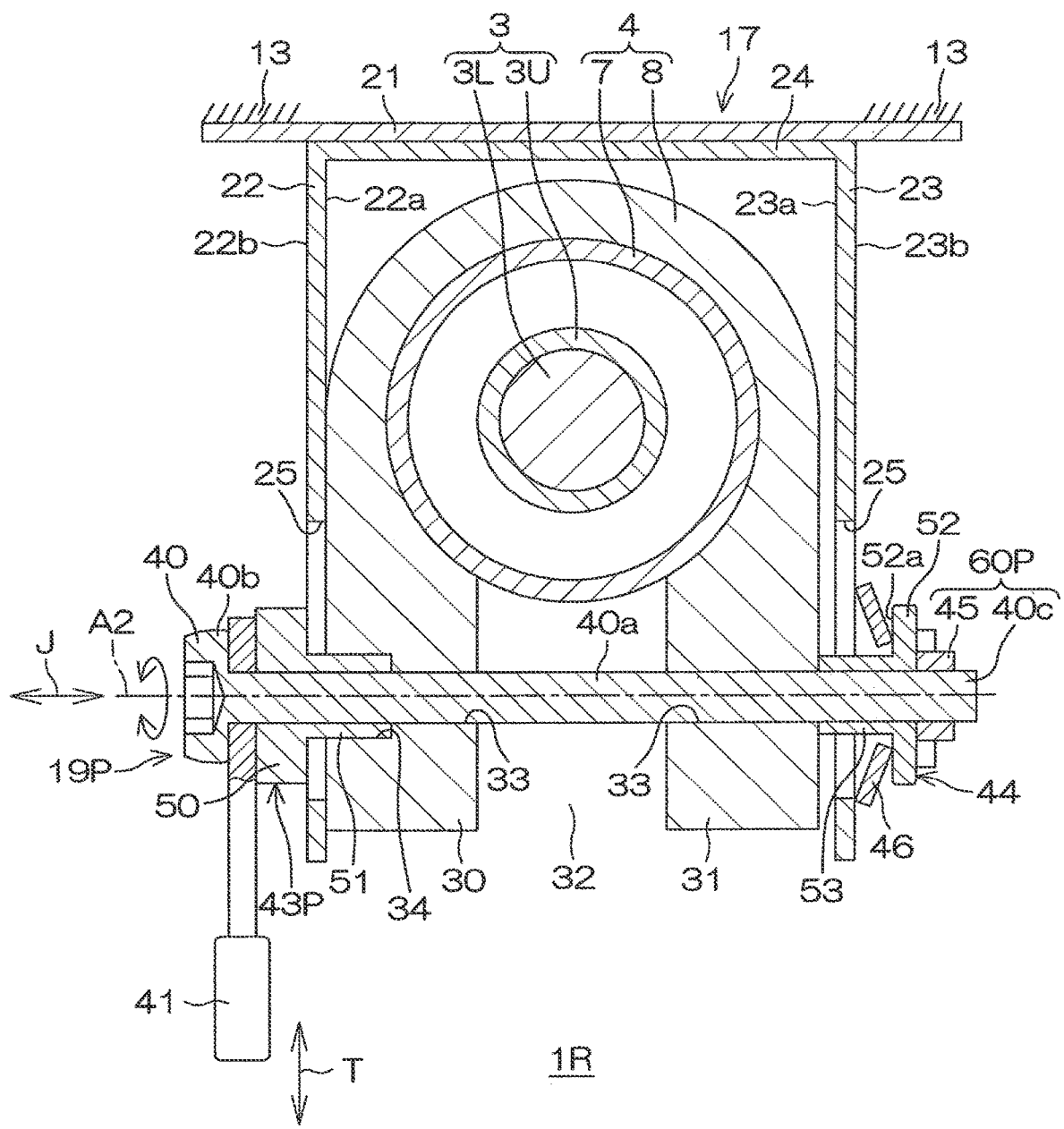
FIG. 12 is a sectional view illustrating a modified example of the steering system according to the fourth embodiment.

The drive mechanism 60P is constituted by the external thread 40c of the insertion shaft 40 and the nut 45. Therefore, the first pressing member 43P and the second pressing member 44 can be caused to approach each other by using a simple structure, namely, the engagement of the bolt (insertion shaft 40) and the nut 45. In the fourth embodiment, the head 40b of the insertion shaft 40 is located across the second outer side plate 23 from the second support portion 31, and the external thread 40c of the insertion shaft 40 is located across the first outer side plate 22 from the first support portion 30. As in a modified example illustrated in FIG. 12, however, the direction of the insertion shaft 40 may be reversed. That is, the head 40b of the insertion shaft 40 may be located across the first outer side plate 22 from the first support portion 30, and the external thread 40c of the insertion shaft 40 may be located across the second outer side plate 23 from the second support portion 31.

In this modified example, the insertion shaft 40 is rotatable relative to the upper fixed bracket 17 and the first and second support portions 30, 31. The nut 45 is fixed to the second pressing member 44, so that rotation of the nut 45 relative to the upper fixed bracket 17 and the first and second support portions 30, 31 is restricted. Therefore, the nut 45 moves in the insertion axis direction J when the insertion shaft 40 is rotated in response to the rotational operation for the operation member 41. The nut 45 can thus be moved toward or away from the head 40b of the insertion shaft 40.

When the operation member 41 is operated rotationally to move the nut 45 in the insertion axis direction J after the telescopic adjustment and the tilt adjustment, the head 40b of the insertion shaft 40 and the nut 45 approach each other. Therefore, the second pressing member 44 is pulled toward the first pressing member 43P together with the nut 45. The first pressing member 43P and the second pressing member 44 thus approach each other in the insertion axis direction J. The present disclosure is not limited to the above embodiments and various modifications may be made within the scope of claims.

In the above embodiments, the first pressing member 43, 43P and the second pressing member 44 approach each other as the second pressing member 44 is pulled toward the first pressing member 43, 43P. However, the drive mechanism 60, 60P may move both the first pressing member 43, 43P and the second pressing member 44 so that the first pressing member 43, 43P and the second pressing member 44 approach each other in the insertion axis direction J along with rotation of the operation member 41.

As an example of a structure for achieving this operation, the first embodiment may be configured to include a drive mechanism between the nut 45 and the second outer side plate 23 in addition to the drive mechanism 60. Specifically, a cam member having a first cam is interposed between the nut 45 and the second pressing member 44, and a second cam that engages with the first cam is formed on the second annular portion 52 of the second pressing member 44. In this case, when the operation member 41 is operated rotationally, both the first pressing member 43 and the second pressing member 44 move in the insertion axis direction J so that the first pressing member 43 and the second pressing member 44 approach each other.

Unlike the above embodiments, the drive mechanism 60, 60P may be configured so that the first pressing member 43, 43P and the second pressing member 44 approach each other as the first pressing member 43, 43P is pulled toward the second pressing member 44. Various other modifications may be made within the scope of the claims.

What is claimed is:

1. A steering system configured to perform tilt adjustment, the steering system comprising:
    a steering shaft to which a steering member is coupled at one end;
    a fixed bracket that is fixed to a vehicle body and includes a first side plate and a second side plate each having an insertion hole;
    a column jacket that supports the steering shaft so that the steering shaft is rotatable, the column jacket is disposed between the first side plate and the second side plate, and the column jacket is configured to move relative to the fixed bracket during the tilt adjustment; and
    a lock mechanism configured to lock a position of the column jacket relative to the fixed bracket after the tilt adjustment, wherein
    the lock mechanism includes:
        an insertion shaft inserted through the insertion hole of the first side plate and the insertion hole of the second side plate;
        an operation member that is supported on the insertion shaft and is operable rotationally;
        a first pressing member configured to press the first side plate to push the first side plate against the column jacket;
        a second pressing member configured to press the column jacket by extending through the insertion hole of the second side plate to directly contact and push the column jacket against the first side plate; and
    a drive mechanism configured to move at least one of the first pressing member and the second pressing member so that the first pressing member and the second pressing member approach each other in an insertion axis direction of the insertion shaft when the operation member is rotated.

2. The steering system according to claim 1, wherein the second pressing member includes a facing portion that faces an outer side surface of the second side plate, and the lock mechanism further includes an elastic member that is configured to be elastically deformed between the facing portion of the second pressing member and the outer side surface of the second side plate when the second pressing member presses the column jacket.

3. The steering system according to claim 1, wherein the drive mechanism includes:
    a first cam configured to rotate together with the operation member; and
    a second cam that is provided on at least one of the first pressing member and the second pressing member and is configured to engage with the first cam.

4. The steering system according to claim 1, wherein the drive mechanism includes:
    an external thread provided at a first end of a shank of a bolt serving as the insertion shaft; and
    a nut that engages with the external thread, and
    the drive mechanism is configured to cause the first pressing member and the second pressing member to approach each other in the insertion axis direction by causing the nut and a head provided at a second end of the shank to approach each other along with the rotation of the operation member.

5. The steering system according to claim 1, wherein the second pressing member directly contacts and pushes the column jacket against the first side plate without pushing the second side plate into contact with the column jacket.

* * * * *